United States Patent [19]
Oki

[11] 3,944,908
[45] Mar. 16, 1976

[54] VOLTAGE CONVERTER
[75] Inventor: Ryuji Oki, Tokyo, Japan
[73] Assignee: Sony Corporation, Tokyo, Japan
[22] Filed: Feb. 7, 1975
[21] Appl. No.: 547,778

[30] Foreign Application Priority Data
Feb. 14, 1974 Japan................................ 49-18024

[52] U.S. Cl..................................... 321/15; 321/20
[51] Int. Cl.².......................................... H02M 7/00
[58] Field of Search................................ 321/15, 20

[56] References Cited
UNITED STATES PATENTS
3,432,738 3/1969 Jensen .................................. 321/15
3,821,627 6/1974 Milovancevic.................... 321/15 X

*Primary Examiner*—William M. Shoop
*Attorney, Agent, or Firm*—Lewis H. Eslinger; Alvin Sinderbrand

[57] ABSTRACT

A voltage converter for boosting the voltage and/or inverting the polarity of a DC voltage source having positive and negative terminals includes at least one series circuit of a capacitor and a diode connected through the latter with one of the voltage source terminals while the other end of the series circuit is alternately connected with the positive and negative voltage source terminals through a respective switching circuit, and an output is derived from the connection point between the capacitor and diode of the series circuit. Such output may be applied, for example, through a peak-value rectifier, to one side of a load having its other side connected to the voltage source terminal opposite to that connected with the diode of the series circuit so that a voltage two times that of the source is applied to the load. If the diode of the series circuit is connected with the negative terminal of the voltage source, the polarity of the voltage applied to the load is inverted. If a second series circuit of a capacitor and diode and an associated switching circuit are combined with the first mentioned series circuit and switching circuit to provide an output of inverted polarity at the connection point between the capacitor and diode of the second series circuit, and the load is connected between such connection point of the second series circuit and the corresponding connection point of the first series circuit, then the voltage applied to the load may be three times the voltage of the source.

4 Claims, 5 Drawing Figures

1

VOLTAGE CONVERTER

BACKGROUND OF THE INVENTION

1. Field of the Invention

This invention relates generally to a voltage converter, and more particularly is directed to an improved transformer-less DC-DC converter for boosting or changing the polarity of a supply voltage.

2. Description of the Prior Art

In order to boost a DC voltage with a DC-DC converter, it has been proposed in the prior art to provide an oscillator operated by the DC voltage, and to boost an output from the oscillator by means of a boosting transformer with the output from the boosting transformer being rectified to obtain the desired DC voltage.

In such a converter, in order to minimize the size of the boosting transformer or to enhance its boosting efficiency, the oscillator has a high frequency, such as, for example, 30 KHz. However, if the oscillation frequency of the oscillator is high and the converter is incorporated in another device, for example, a radio receiver, or used together with the latter, high harmonics of the output from the oscillator are received by the radio receiver and disturb other signals. Further, leakage magnetic flux from the boosting transformer may adversely affect other circuits.

OBJECTS AND SUMMARY OF THE INVENTION

Accordingly, it is an object of this invention to provide improved voltage converters which are free from the above mentioned disadvantages of the prior art.

More specifically, it is an object of this invention to provide a voltage converter without a boosting transformer, and hence, which may be small in size and light in weight.

Another object of the invention is to provide a voltage converter which can be made as an intgrated circuit.

Still another object of the invention is to provide a voltage converter in which the idling current is small when no load is applied thereto.

It is a further object of the invention to provide a voltage converter in which an oscillator thereof can have a low oscillation frequency so that only extremely high harmonics of its oscillation pulses will be in the radio frequency range, and by reason of the low level of such extremely high harmonics, will not disturb the operation of adjacent radios or other instruments.

It is a still further object of the invention to provide a voltage converter which can drive a load, such as, a light emission diode, with a high voltage even if the voltage of a voltage source is relatively low.

In accordance with an aspect of this invention, a voltage converter includes at least one series circuit of a capacitor and a diode connected through the latter with one of the terminals of a DC voltage while the other end of the series circuit is alternately connected with the positive and negative terminals of the voltage source through a respective switching circuit, and an output is derived from the connection point between the capacitor and diode of the series circuit. When such output is applied, for example, through a peak-value rectifier, to one side of a load having its other side connected to the voltage source terminal opposite to that connected with the diode of the series circuit, the voltage applied to the load is two times that of the voltage source. If it is desired to invert the polarity of the voltage applied to the load, the diode of the series circuit is connected with the negative terminal of the voltage source.

It is another feature of this invention to combine a second series circuit of a capacitor and a diode and an associated switching circuit, as aforesaid, with the first mentioned series circuit and switching circuit to provide an output of inverted polarity at the connection point between the capacitor and diode of the second series circuit while an output which has a voltage two times that of the voltage source is provided at the corresponding connection point in the first series circuit so that, with the load connected between such connection points of the first and second series circuits, a voltage that is three times that of the voltage source is applied to the load.

The above and other objects, features and advantages of this invention, will become apparent from the following description which is to be in conjunction with the accompanying drawings.

DESCRIPTION OF THE PREFERRED EMBODIMENTS

Figure 1:
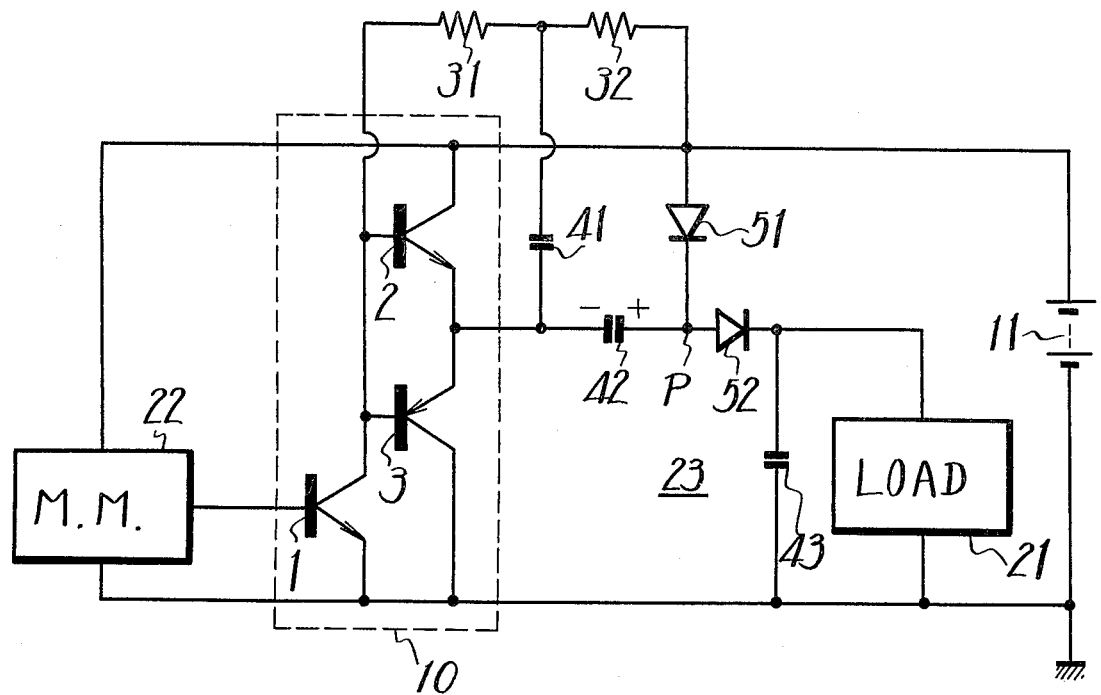
FIG. 1 is a circuit diagram showing a voltage converter according to an embodiment of this invention.

FIG. 1 shows a voltage converter according to an embodiment of this invention which is suitable for example, for energizing a light emission diode (which will be hereinafter referred to as an LED). Since an LED generally requires about 2 volts (2V) for its illumination, the LED cannot be driven or illuminated by a DC voltage source constituted by a single dry cell providing 1.5V. Therefore, the embodiment of FIG. 1 is adapted to provide a boosted output voltage which is twice that of a voltage source.

The circuit of FIG. 1 generally comprises a switching means or circuit 10 which consists of transistors 1,2 and 3; a DC voltage source 11 which may be a dry cell of 1.5V; a load 21 which may be an LED; an astable multivibrator 22 for pulse oscillation which is supplied with the voltage $V_{cc}$ from DC voltage source 11 as an operating voltage; and a peak-value rectifier circuit 23. An oscillation pulse from the output of astable multivibrator 22 is applied to the base electrode of transistor 1. Resistors 31 and 32 are connected between the positive terminal or electrode of DC voltage source 11 and the collector electrode of transistor 1, and the emitter electrode of transistor 1 is connected to the negative terminal or electrode of DC voltage source 11.

The switching transistors 2 and 3 of switching circuit 10 are connected in a complementary manner and their base electrodes are connected together to the collector electrode of transistor 1. The collector electrode of transistor 2 is connected to the positive electrode of DC voltage source 11, and the emitter electrode of transistor 2 is connected to the emitter electrode of transistor 3 whose collector electrode is connected to the negative electrode of DC voltage source 11. The connection point between the emitter electrodes of transistors 2 and 3 is connected through a boost-trap capacitor 41 to a connection point between resistors 31 and 32. The peak-value rectifier circuit 23 is shown to consist of a diode 52 and a capacitor 43.

The connection point between the emitter electrodes of transistors 2 and 3 is connected further to the positive electrode of DC voltage source 11 through a series connection of a capacitor 42 and a diode 51 which forms an output circuit. A connection point P between capacitor 42 and diode 51 is connected through the peak-value rectifier circuit 23 to the negative electrode of DC voltage source 11. The capacitor 43 is connected in parallel to load 21, which, as noted above, may be an LED, and the negative electrode of DC voltage source 11 is grounded.

With the above described circuit constituting a voltage converter, transistor 1 is turned ON and OFF with the oscillation pulse from multivibrator 22 and, accordingly, transistors 2 and 3 are alternately turned ON and OFF. If it is assumed that, during a time interval T$a$, transistor 2 is OFF, then the transistor 3 is ON, and a current may flow through the circuit from the positive electrode of DC voltage source 11 through diode 51, capacitor 42 and the emitter-collector path of transistor 3 to the negative electrode of DC voltage source 11 to rapidly charge capacitor 42 to the voltage $V_{cc}$ of DC voltage source 11 with the polarity shown on FIG. 1. At this time, the voltage at the point P is the voltage $V_{cc}$ relative to the ground, as shown on FIG. 2, and it will be seen that, in this case, diode 51 and transistor 3 are a means through which capacitor 42 is charged.

When, during the following time interval T$b$, the ON and OFF states of transistors 2 and 3 are reversed, that is, transistor 2 is ON and transistor 3 is OFF, the charged capacitor 42 is connected in series with DC voltage source 11 through transistor 2. Thus, in such state of the circuit, the charge on capacitor 42 is, in effect, added to the voltage $V_{cc}$ of source 11, and consequently the voltage at the point P becomes $2V_{cc}$.

Figure 2:
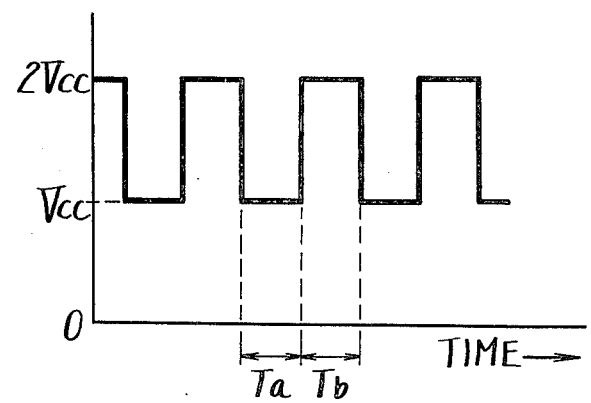
FIG. 2 is a waveform diagram to which reference will be made in explaining the operation of the voltage converter of FIG. 1.

Thus, when the transistors 2 and 3 are turned ON and OFF alternately and sequentially, there are obtained, at the point P, pulses which are changed between the voltages $V_{cc}$ and $2V_{cc}$ as shown on FIG. 2. Such pulse voltages obtained at the point P are peak-value-rectified by the peak-value rectifier circuit 23, so that load 21 is supplied continuously with a voltage of $2V_{cc}$. As a result, load or LED 21 is illuminated even if the voltage of source 11 is too low for that purpose.

From the foregoing, it will be seen that, with a circuit according to the present invention, a DC voltage can be boosted up. The oscillation frequency of the multivibrator 22 included in the voltage converter according to this invention can be relatively low, for example, 500 Hz, so that only extremely high harmonics of oscillation pulses from multivibrator 22 are in the frequency range that may disturb radio reception. However, such extremely high harmonics, if they exist at all, are of low level or amplitude and, therefore, radio reception is not disturbed thereby.

Further, with the circuit according to the invention, leakage magnetic flux is not produced as in the case of using a boosting transformer, so that other circuits are not adversely affected.

In addition, since no boosting transformer is included in the circuit according to the invention, the latter can be minimized in size and weight, and may be formed as an integrated circuit. Further, the idling current is small when no load is applied. For example, it has been found that even if the voltage $V_{cc}$ of voltage source 11 is 4.5V instead of 1.5V, the consumed current, when no load is applied, is only about 3mA. Further, the efficiency is in the order of 80% with a load current of 50mA, and in the order of 70% when the load current is 200mA.

Figure 3:
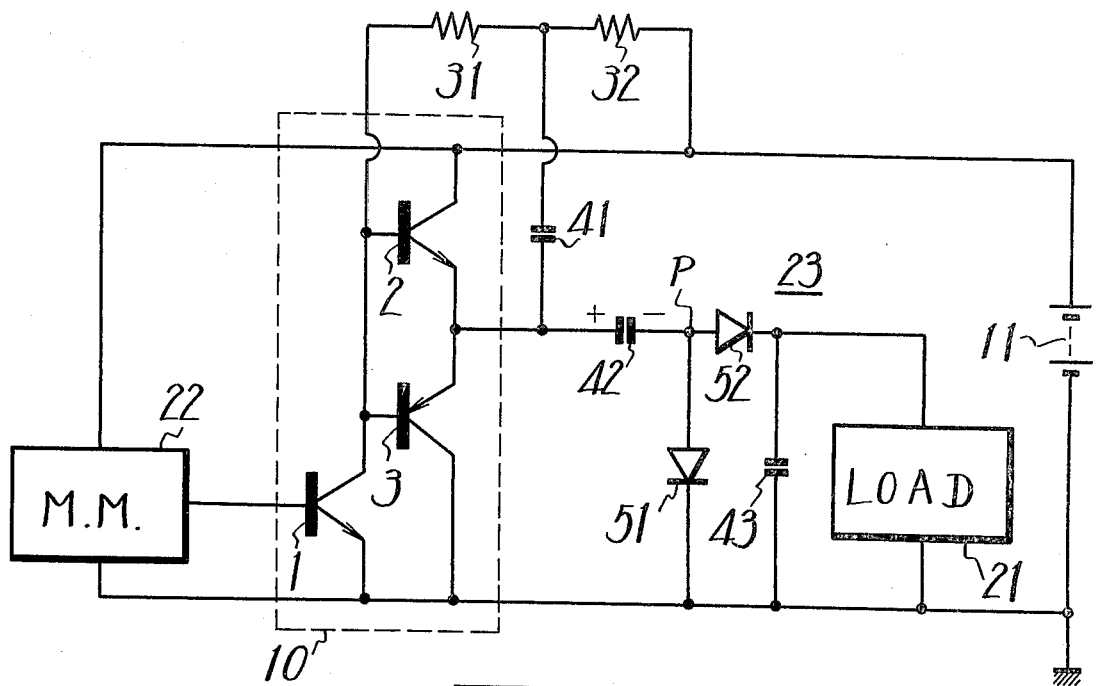
FIGS. 3, 4 and 5 are circuit diagrams showing other embodiments of voltage converters according to this invention.

FIG. 3 shows another embodiment of the invention in which the elements corresponding to those described above with reference to FIG. 1 are identified by the same reference numerals. In the embodiment of FIG. 3, the diode 51 is connected between the connection point P of capacitor 42 with diode 52 and the negative electrode of DC voltage source 11, rather than between such connection point P and the positive electrode of source 11, as on FIG. 1. Otherwise, the circuit of FIG. 3 is the same as that of FIG. 1.

With the embodiment of FIG. 3, when transistor 2 is ON and transistor 3 is OFF, capacitor 42 is charged through transistor 2 and diode 51 by the DC voltage source 11 to the voltage $V_{cc}$ with the polarity shown on FIG. 3. At this time, the voltage at the point P becomes the ground potential or 0. On the contrary, when transistor 2 is OFF and transistor 3 is ON, the potential at the connection point of the emitter electrodes of transistors 2 and 3 becomes the ground potential or 0 and the potential at the point P becomes $-V_{cc}$. Therefore, at the point P, there are obtained pulse voltages which are changed between the values $-V_{cc}$ and 0. Such pulse voltages are peak-value-rectified by the peak-value rectifier circuit 23, so that the negative voltage of $-V_{cc}$ is continuously applied to the load 21. In other words, the voltage converter constituted by the embodiment shown on FIG. 3 can invert the polarity of the voltage from source 11.

Figure 4:
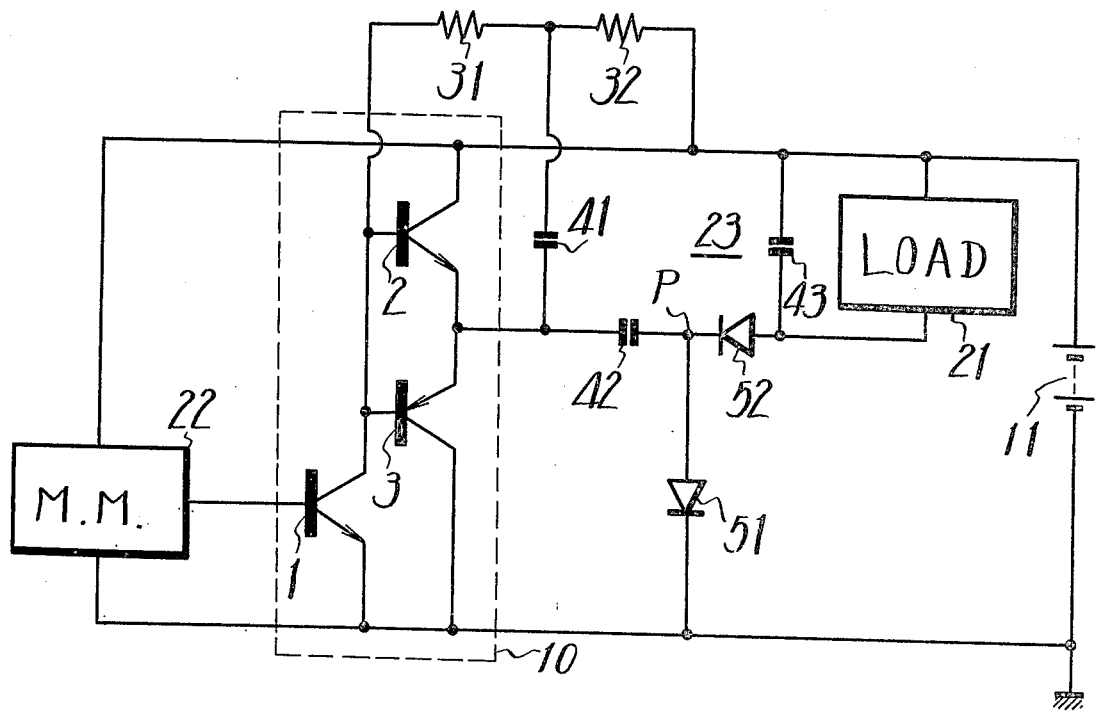

Referring now to FIG. 4, in which elements corresponding to those described above with reference to FIGS. 1 and 3 are identified by the same reference numerals, it will be seen that a voltage converter according to this invention may be arranged to both boost and invert the polarity of the voltage from source 11. In the circuit of FIG. 4, the peak-value rectifier circuit 23 is connected between the positive terminal of voltage source 11 and connection point P of capacitor 42 with diode 51, and the polarity of diode 52 in circuit 23 is reversed in respect to the polarity of diode 52 in the circuits of FIGS. 1 and 3. Further, the load 21 in FIG. 4 is connected between the positive terminal of voltage source 11 and the connection point of diode 52 with capacitor 43 in circuit 23. Finally, in the circuit of FIG. 4, the diode 51 is connected to the negative terminal of voltage source 11 and is conductive in the direction from point P toward the negative terminal of source 11.

In operation of the voltage converter of FIG. 4, when transistor 2 is ON and transistor 3 is OFF, capacitor 42 is charged to the voltage of source 11 with the point P then being at ground potential or 0 volts. During the following time interval, when transistor 2 is OFF and transistor 3 is ON, the previously charged capacitor 42 is connected in series with voltage source 11 through transistor 3 with the effect that the potential at point P becomes $-V_{cc}$. Therefore, the peak-value rectifier circuit 23 continuously applies the voltage $-V_{cc}$ to the load 21 in FIG. 4 while the voltage of source 11 applies the voltage $+V_{cc}$ to the load, resulting in a voltage across the load of $2V_{cc}$.

Figure 5:
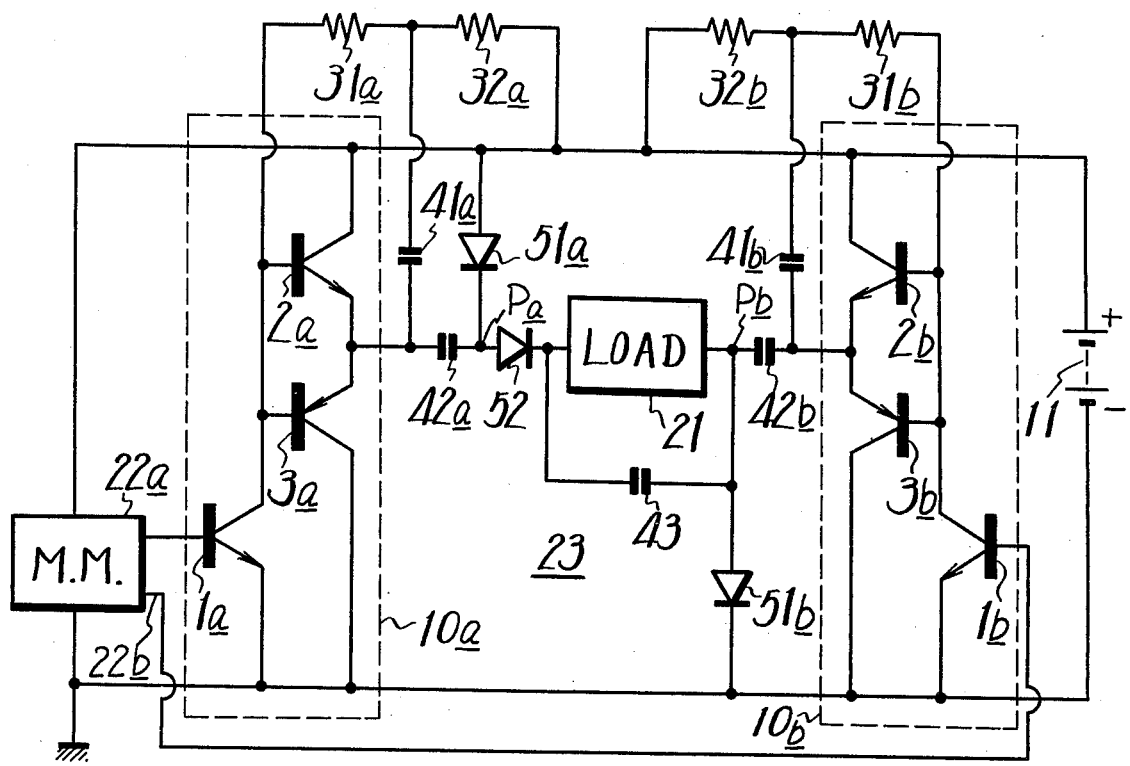

Referring now to FIG. 5, it will be seen that, in accordance with another embodiment of this invention, the voltage applied to the load 21 may be boosted more than 2 times the voltage of the source 11, as in FIG. 1. More specifically, in the voltage converter of FIG. 5, the elements identified by reference numerals with the letter "a" appended thereto correspond to the similarly numbered elements of the circuit described above with reference to FIG. 1, and the elements identified by the reference numerals with the letter "b" appended thereto correspond to the similarly numbered elements of the circuit described above with reference to FIG. 3. Thus, it will be seen that the voltage converter of FIG. 5, in effect, is a combination of the circuits of FIGS. 1 and 3, respectively, with a single peak-value rectifier circuit 23 constituted by diode 52 and capacitor 43 being connected between the points Pa and Pb of the combined circuits. Further, in the circuit of FIG. 5, the load 21 is connected in parallel with capacitor 43, that is, between the connection point of diode 52 with capacitor 43 and the connection point Pb. Finally, in the circuit of FIG. 5, the multivibrator 22 has two outputs 22a and 22b respectively connected to the base electrodes of transistors 1a and 1b in switching circuits 10a and 10b, respectively, and such outputs 22a and 22b provide similar oscillation pulses, but with their phases reversed in respect to each other.

It will be apparent that, in the operation of the voltage converter of FIG. 5, a voltage of $2V_{cc}$ is provided at one side of load 21 and a voltage of $-V_{cc}$ is provided at the other side of load 21 so that a voltage of $3V_{cc}$ is applied across load 21.

Although illustrative embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A transformer-less voltage converter for use with a DC voltage source having positive and negative terminals comprising:
    at least one series circuit including a capacitor and a diode;
    means for connecting the diode end of said series circuit with said negative terminal of the DC voltage source;
    peak-value rectifying means including a capacitor and a diode connected between the connection point between said capacitor and said diode in said series circuit and said positive terminal of the DC voltage source;
    a load connected in parallel with said capacitor of said peak-value rectifying means; and
    switching means coupled to said series circuit and operative for connecting the capacitor end of said series circuit alternately with said positive and negative terminals of the DC voltage source, said switching means including a pair of transistors connected in complementary manner and in series with each other between said positive and negative terminals of the DC voltage source and being alternately energized by oscillating means, said capacitor end of the series circuit being connected to the junction formed by said series connected transistors.

2. A transformer-less voltage converter in accordance with claim 1 further comprising a second series circuit including a capacitor and a diode, means for connecting the diode end of said second series circuit with said positive terminal of the DC voltage source, said peak-value rectifying means being connected to said positive terminal of the DC voltage source through said diode of said second series circuit, second switching means coupled to said second series circuit and operative in opposed phase relation to the first-mentioned switching means for connecting the capacitor end of said second series circuit alternately with said negative and positive terminals of the DC voltage source, said second switching means including a second pair of transistors connected in complementary manner and in series with each other between said positive and negative terminals of the DC voltage source and being alternately energized by said oscillating means, said capacitor end of said second series circuit being connected to the junction formed by said second pair of transistors.

3. A transformer-less voltage converter for use with a constant magnitude DC voltage source having positive and negative terminals, comprising a first series circuit including a diode connected to the positive terminal, and a capacitor; first switch means connected to the capacitor of said first series circuit for alternately coupling said capacitor to said positive and negative terminals; a second series circuit including a diode connected to the negative terminal, and a capacitor; second switch means connected to the capacitor of said second series circuit for alternately coupling the second capacitor to said negative and positive terminals, respectively, in opposed relation to the alternate coupling of the first-mentioned capacitor by said first switch means; and a peak-value rectifying circuit connected between the connection point formed by the diode and capacitor in said first series circuit and the connection point formed by the diode and capacitor in said second series circuit; whereby a load is adapted to be connected to said peak-value rectifying circuit.

4. A transformer-less voltage converter in accordance with claim 3 wherein said peak-value rectifying circuit is comprised of a diode poled in the direction to transfer a positive voltage from the connection of the first series circuit to a load connected thereto; and a capacitor disposed for parallel connection to said load.

* * * * *